United States Patent
Ushinsky et al.

(10) Patent No.: US 9,463,977 B2
(45) Date of Patent: Oct. 11, 2016

(54) SACRIFICIAL LIMITER FILTER

(75) Inventors: Michael Ushinsky, Irvine, CA (US); Mitchell Haeri, Irvine, CA (US)

(73) Assignee: RAYTHEON COMPANY, Waltham, MA (US)

( * ) Notice: Subject to any disclaimer, the term of this patent is extended or adjusted under 35 U.S.C. 154(b) by 859 days.

(21) Appl. No.: 13/563,081

(22) Filed: Jul. 31, 2012

(65) Prior Publication Data
US 2014/0036369 A1 Feb. 6, 2014

(51) Int. Cl.
| | | |
|---|---|---|
| G02B 1/10 | (2015.01) | |
| B82Y 10/00 | (2011.01) | |
| G02B 1/14 | (2015.01) | |
| G02B 5/00 | (2006.01) | |
| G02F 1/35 | (2006.01) | |

(52) U.S. Cl.
CPC .............. *B82Y 10/00* (2013.01); *G02B 1/105* (2013.01); *G02B 1/14* (2015.01); *G02B 5/008* (2013.01); *G02F 1/3523* (2013.01); *G02F 2203/52* (2013.01)

(58) Field of Classification Search
CPC .......... G02B 5/008; G02B 5/22; G02B 5/23; G02B 1/10; G02F 1/3523; G02F 2203/52
USPC ........................... 359/585, 577, 580; 977/890
See application file for complete search history.

(56) References Cited

U.S. PATENT DOCUMENTS

| | | | |
|---|---|---|---|
| 4,390,589 A | | 6/1983 | Geyling et al. |
| 5,090,008 A | * | 2/1992 | Clark ................ G11B 7/00452 346/135.1 |
| 5,517,486 A | | 5/1996 | Haneda |
| 5,844,668 A | * | 12/1998 | Lepain et al. .................. 356/43 |
| 6,624,576 B1 | * | 9/2003 | Mittler ................. H01J 61/366 313/332 |
| 7,123,416 B1 | | 10/2006 | Erdogan et al. |
| 2004/0084444 A1 | | 5/2004 | Wang et al. |
| 2005/0286383 A1 | * | 12/2005 | Mizushima ........ G11B 7/00456 369/59.11 |
| 2006/0067197 A1 | * | 3/2006 | Mizushima .......... G11B 7/0062 369/116 |
| 2006/0208640 A1 | * | 9/2006 | Mittler ...................... H01J 9/28 313/623 |
| 2007/0077522 A1 | * | 4/2007 | Satoh ................... G11B 7/2403 430/270.11 |
| 2007/0202403 A1 | * | 8/2007 | Oh ........................ H01M 4/133 429/217 |
| 2008/0213539 A1 | * | 9/2008 | Souriau ............... B81C 1/00285 428/156 |
| 2009/0283726 A1 | * | 11/2009 | Mizoguchi ............... A61K 8/30 252/582 |
| 2011/0249267 A1 | * | 10/2011 | Kang et al. .................... 356/445 |

FOREIGN PATENT DOCUMENTS

| | | |
|---|---|---|
| WO | 03007314 A1 | 1/2003 |
| WO | 2010104600 A1 | 9/2010 |
| WO | WO 2010104600 A1 * | 9/2010 ............... H01B 1/06 |

OTHER PUBLICATIONS

Stultz, Robert D. et al., "Subnanosecond Bulk Damage Thresholds of Single-Crystal YAG and Diffusion-Bonded YAG Structures at 1 Micron", Laser-Induced Damage in Optical Materials, SPIE Proceedings, vol. 8190, 2011.

Chen, Y-C, et al., "Ultrafast Optical Switching Properties of Single-Wall Carbon Nanotube Polymer Composites at 1.55 μm", Applied Physics Letters, vol. 81, No. 6, Aug. 5, 2002, pp. 975-977.

The Applicant would like to bring to the Examiner's attention the enclosed Search Report and Written Opinion from corresponding PCT Application No. PCT/US2012/069423.

* cited by examiner

*Primary Examiner* — Bumsuk Won
*Assistant Examiner* — William R Alexander
(74) *Attorney, Agent, or Firm* — Lando & Anastasi, LLP

(57) ABSTRACT

A sacrificial limiter filter may include a substrate and a metal nano-coating and/or a polymer/carbon allotrope coating. The sacrificial limited filter may transmit optical radiation having desired frequencies and/or intensities while blocking optical radiation having undesired frequencies and/or intensities.

19 Claims, 15 Drawing Sheets

SACRIFICIAL LIMITER FILTER

BACKGROUND

Recent advances in electro-optics and lasers have facilitated extensive developments in the field of laser hardening components protecting, for example, opto-electronic sensors, CCD cameras, imagers, and detectors. Passive filters typically include different thin planar windows that are fabricated from precisely formulated binary and ternary semiconductors. Among these are mercury cadmium telluride (HgCdTe) and/or gallium indium arsenide (GaInAs) family materials. These types of filters may be suitable for use with infrared sensor devices. These semiconductors transmit mid-infrared signals, having a wavelength often exceeding about 2.5 microns ($\mu m$), and block radiation having a wavelength below about 2 microns. The transmission of operational signals through a 1 millimeter (mm) thick window typically varies from about 40% to about 53%, depending on the crystal/alloy formulation. The absorptive and scattering properties of these filters may remain constant over operations with all types of optical signals, including both continuous wave and pulsed signals. For example, for InGaAs, optical signals having wavelength exceeding 2.5 microns at power levels from, for example, 0.1 watts (W) to about 100 W may not change the performance, for example, spectral transmission and/or limiting level of the semiconductor window-filter and it can be used many times. The semiconductor crystal is generally not degraded after the multiple limiting operations. Object-detection sensors are typically utilized to process weak operational signals that are reflected from the ground or remote objects. The limited optical transmissions of semiconductors, and inevitable wave front errors aggravate the detection and reduce the quality of the obtained and processed information.

SUMMARY

Aspects and embodiments of the present invention are directed generally to laser hardening components which may be used for protection of electro-optic sensors and to the fabrication of such laser hardening components. Some embodiments are directed to a Sacrificial Limiter Filter (an "SLF," also referred to herein as simply a "filter") including one or more coated filtering components. In some embodiments an SLF may be configured and arranged to transmit operational signals to an electro-optic sensor and block unwanted light beams that might otherwise damage the sensor or constitute spurious optical signals which may swamp the signals intended to be detected and analyzed. Embodiments of an SLF in accordance with the present disclosure may comprise a neutral density passive or actively tuned electro-optical filter.

Embodiments of an SLF in accordance with the present disclosure may facilitate blocking unwanted light that would otherwise constitute spurious optical signals and/or swamp the signals to be detected and analyzed by an electro-optic sensor.

In some embodiments, design of an SLF may include the selection of appropriate coating material(s) and coating thickness(es) of metal nano-coating(s), so operational light beams can transmit the operational signals without spectral reshaping or with a well predicted correction of transmission and reflected spectra. In some embodiments, the metal nano-coatings include eutectic metal alloys. These eutectic metal alloys may be selected from alloys having a solidus at a low temperature, for example, below about 200° Celcius.

Design of an SLF may include the selection of a deposition technique that leads to a formation of clustered nano-agregates of deposited metal in accordance with their thermodynamic stabilities which provide for a desired magnitude of electromagnetic field and quantity and magnitude of surface plasmons when irradiated.

Design of an SLF may include the design of micro- and macro-patterning of the metal nano-coating to facilitate the plasmon resonance magnitudes achieving a desired level. The deposited eutectic metal coating may form a dual-periodicity planar pattern. The patterning may include "open loop" and/or "closed loop" appearances (or contours) having primarily in-plane (or X-Y) periodicity. In some embodiments, the patterning may include an additional cross-plane (or Z) periodic contour elevations. The shapes of these patterns may include, for example, periodic short strips, C- and O-contours, and/or rectangular frames. The thickness of the patterning may in some embodiments be in a range of from about 30 nanometers (nm) to about 40 nm, while the in-plane linear dimensions are may be in a range of from about one micron to about five microns, depending on the wavelength of the anticipated unwanted radiation. The patterning may be deposited on the substrate using conventional metal deposition (for example, physical vapor deposition) and patterning techniques (for example lithographic patterning and chemical or plasma etching) used in semiconductor device fabrication. The deposited patterning may amplify the plasmon resonance and intensify and localize the electromagnetic field in a periodic manner, so the local maximums are closely positioned. This localization may facilitate generation of an overall heat flux that can be sufficient to melt at least a portion of the metal nano-coating.

Design of an SLF may include the selection and/or design of a substrate that allows the proper insulation of thermal fluxes induced in the metal nano-coating due to plasmon resonance while also facilitating a quick transitional heat transfer.

Design of an SLF may include the selection of low solidus alloys, in which a thermally-assisted phase transition leads to dramatic increase in light absorption in certain bands of interest. Evaluation of time delay conditions for phase transition and subsequent re-crystallyzation of the low solidus alloys may be performed to refine the design.

Design of an SLF may include formulation of a second coating complimentary to the metal nano-coating. The second coating may include a robust polymer matrix filled with carbon nano-tubes, fullerene, and/or grapheme allotropes of carbon. Design of an SLF may further include optimization of filler concentration and deposition of the formulated nano-composite material to facilitate a desired resolution of patterning by, for example, microlithography and cure. The second coating may include a periodic cell texture, including one or more of carbon nano-tubes, fullerenes, and/or grapheme fillers within the cells. Evaluation of conditions of ultrafast saturation of the polymer matrix may be performed to refine the design.

Design of an SLF may include the development of feasible SLF designs employing both the metal nano-coating and the polymer/carbon filler filters. Evaluation of time response factor for an SLF may be performed to refine the design.

A method of forming an SLF may include forming robust, morphologically and structurally stable nano-clustered aggregate metal films on an inexpensive dielectric substrate.

In accordance with an aspect of the present disclosure there is provided a sacrificial limiter filter. The sacrificial limited filter comprises a substrate, a polymer/carbon allotrope coating adhered to the substrate, and a metal nano-coating adhered to the substrate.

In accordance with some embodiments the polymer/carbon allotrope coating includes one or more of carbon nano-tubes, fullerenes, and graphenes embedded in a polymer matrix. The one or more of carbon nano-tubes, fullerenes, and graphenes may be included in the polymer/carbon allotrope coating in an amount of between about 0.5% and about 2% by weight. The metal nano-coating may include a eutectic alloy having a melting temperature of less than about 200° C.

In accordance with some embodiments a first side of the polymer/carbon allotrope coating is directly adhered to a first side of the substrate and a first side of the metal nano-coating is directly adhered to a second side of the substrate.

In accordance with some embodiments the sacrificial limiter filter further comprises a second substrate directly adhered to one of a second side of the metal nano-coating and a second side of the polymer/carbon allotrope coating.

In accordance with some embodiments the polymer/carbon allotrope coating and the metal nano-coating are both adhered to a first side of the substrate. A first side of the polymer/carbon allotrope coating may be directly adhered to the first side of the substrate and a first side of the metal nano-coating may be adhered to a second side of the polymer/carbon allotrope coating. A first side of the metal nano-coating may be directly adhered to the first side of the substrate and a first side of the polymer/carbon allotrope coating may be directly adhered to a second side of the metal nano-coating.

In accordance with some embodiments the eutectic alloy is one of an indium based alloy and a bismuth based alloy.

In accordance with some embodiments the metal nano-coating includes patterning configured to amplify a magnitude of plasmonic resonance induced by exposure of the metal nano-coating to incident optical radiation.

In accordance with some embodiments the substrate comprises one of glass, fused silica, acetate, and polyamide.

In accordance with some embodiments the sacrificial limiter filter is mounted on a translational mechanism proximate an aperture of an optical sensor, the translational mechanism configured to displace a damaged portion of the sacrificial limiter filter out of a path of optical radiation into the aperture and to displace an undamaged portion of the sacrificial limiter filter in to a path of optical radiation into the aperture.

In accordance with some embodiments the sacrificial limiter filter further comprises a contour metallization lead-frame in electrical contact with the metal nano-coating and configured to deliver electrical energy to the metal nano-coating and preheat the metal nano-coating.

In accordance with some embodiments the metal nano-coating is a neutral density optical filter.

In accordance with another aspect of the present disclosure there is provided a method of fabricating a sacrificial limiter filter. The method comprises selecting a first substrate substantially transparent to a desired wavelength of optical radiation, depositing a polymer/carbon allotrope coating on the substrate, and depositing a metal nano-coating of a eutectic alloy on the substrate.

In accordance with some embodiments the method further comprises adhering a second substrate to a surface of one of the polymer/carbon allotrope coating and the metal nano-coating on an opposite side of the one of the polymer/carbon allotrope coating and the metal nano-coating as the first substrate.

In accordance with some embodiments the polymer/carbon allotrope coating and the metal nano-coating are deposited on a same side of the first substrate.

In accordance with some embodiments polymer/carbon allotrope coating and the metal nano-coating are deposited on opposite sides of the first substrate.

In accordance with some embodiments the method further comprises forming a contour metallization lead-frame in electrical contact with opposing edges of the metal nano-coating.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
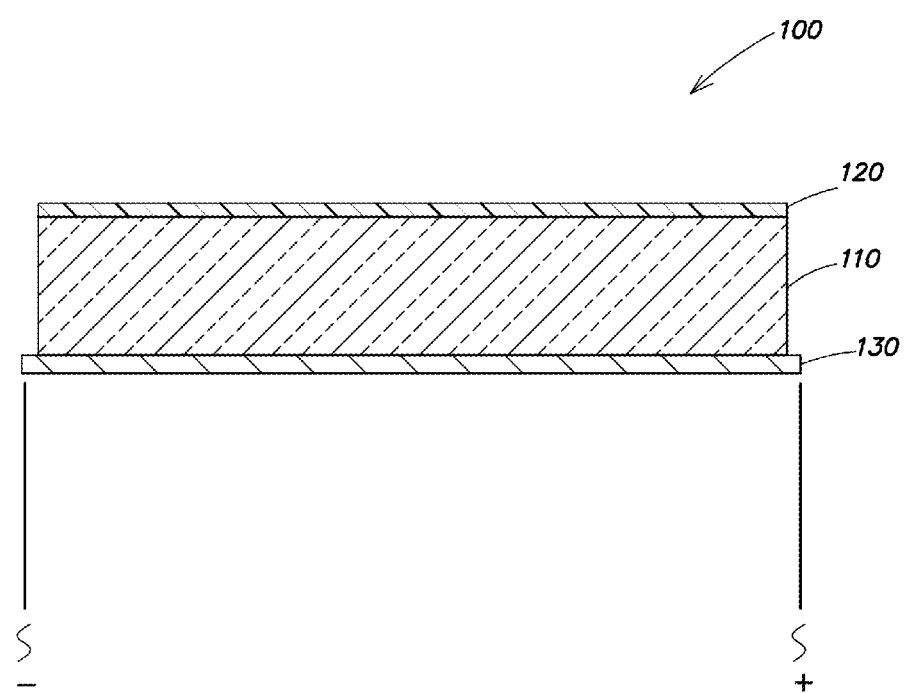
FIG. 1 is an example of a sacrificial limiter filter in accord with aspects of the present invention.
Figure 2A:
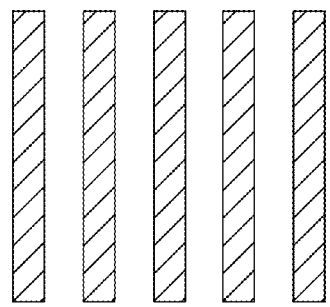
FIGS. 2A-2D are examples of patterns for a metal nano-coating for a sacrificial limiter filter in accord with aspects of the present invention.
Figure 2B:
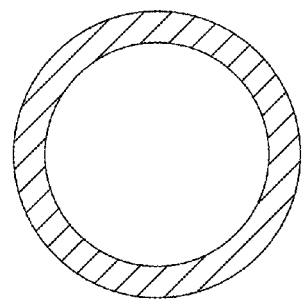
Figure 2C:
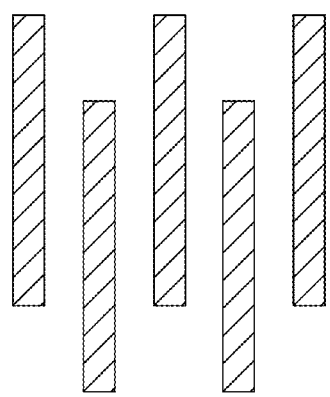
Figure 2D:
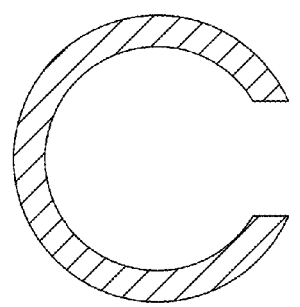

Opto-electronic sensors, CCD cameras, imagers, detectors, and other photosensitive devices may desirably be provided with a mechanism to provide protection against unwanted electromagnetic radiation, for example, optical radiation, which might otherwise damage or impair the functionality of such devices. Some forms of protection mechanisms may include, for example, filters which may be placed in the path of optical radiation into apertures of such devices. The filters may provide protection by admitting certain wavelengths of light while blocking others, and/or by admitting optical radiation below a certain intensity while blocking higher intensity optical radiation.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Although embodiments detailed herein relate to electro-optical designs and fabrication technology of SLFs, these embodiments are offered merely for illustration and are not intended to limit the scope of the present invention. Various and further detailed configurations of SLF components and fabrication techniques are also considered within the scope of the present invention.

Aspects and embodiments of the present invention may include laser hardening components which may be used for protection of electro-optic sensors. Embodiments of the laser hardening components may include a neutral density passive or actively tuned electro-optical filter. Embodiments of the laser hardening components may comprise an SLF. Embodiments of SLFs disclosed herein may facilitate blocking unwanted light that would otherwise constitute spurious optical signals and/or swamp the signals to be detected and analyzed by an electro-optic sensor used in, for example, ground vehicles, airplanes, or satellites.

In some embodiments, an SLF may include substrate(s) made of a material such as glass or a polymer which may be transparent to a wavelength of light of interest. One or more nano-coatings may be present on the substrate(s). The nano-coatings may be selectively tuned to certain operational and blocking bands, so they can transmit, for example, infrared operational signal(s) and block unwanted light. In some embodiments, one or both of two nano-coatings or the SLF as a whole may be sacrificial, in that they may be damaged or destroyed during use. Embodiments of the SLF may also include a contour metallization lead-frame, as discussed further below.

It has been discovered the absorption and the combined absorption/scattering of light by certain eutectic materials can be modified dramatically by 2-7 orders of magnitude due to a solid-to-liquid phase transition of the eutectic materials. The following example forms a useful analogy. An optical property of ice which causes spectral variation in the reflectance of snow in visible and near-infrared wavelengths, is that the absorption coefficient (the imaginary part of refractive index) varies by 7 orders of magnitude at wavelengths from 0.4-2.5 micrometers due to its temperature-dependent phase transition from solid to liquid phase (ice-snow-water phase transformation). Similar effects can be also observed in the phase transitions of metals and metal alloys, particularly in certain eutectic alloys. By achieving fast phase transition in a thin metal film, for example, a eutectic alloy film having a thickness of between about 20 nm and about 50 nm, an SLF may be fabricated utilizing the thin eutectic alloy film. With these dimensions, the thickness of metal film does not exceed the mean free path of electrons, photons, and/or phonons, and therefore may transmit light having desired wavelengths or operation signals as a neutral density optical filter.

Accordingly, as illustrated in FIG. 1, a first of two nano-coatings of an SLF 100 in accordance with embodiments of the present invention may include an optically neutral or optically low density film comprising clustered metal nano-particles (a "metal nano-coating") 130. The metal nano-coating 130 may be fabricated from a eutectic alloy having a low temperature solidus in the range of, for example, from about 70° C. to about 200° C. In the case of, for example, indium-based alloys, the clustered nano-particles may have dimensions of from about two nm to about seven nm across.

When an unwanted light beam hits the filter and/or external electric current is applied, an induced electromagnetic field may generate surface plasmon resonance in the metal nano-coating. The resonating electric currents and ballistic conductivity mechanisms in the metal nano-coating may cause an increase in the temperature of the metal nano-coating. The increased temperature may quickly approach the solidus of a low melting temperature alloy included in or forming the metal nano-coating. In some embodiments, an unwanted light beam with a power level consistent with certain laser systems utilized in the field of defense, for example, between about 0.1 W and about 10 W may be sufficiently powerful to induce plasmon resonance and melt the metal (plasmonic) nano-coating. Even low to moderate power laser beams, for example beams having a power of about one W, can cause plasmon resonance at certain frequencies which may become sufficient for the melting and phase transition of the metal nano-coating. Patterning of the metal nano-coating, for example, with a dual-periodic patterning may enhance the plasmon resonance and heat generation upon application of optical radiation. The engineered patterning can facilitate the operation protection even for low to moderate power beams of unwanted radiation. The patterning of the metal nano-coating may fine tune the metal nano-coating to exhibit surface plasmon resonance leading to ballistic conductivity, heat generation, and phase transition effects when exposed to desired frequencies of optical radiation.

A phase transition in the metal nano-coating due to its melting and accompanying re-crystallization may lead to an increase in the light absorption coefficient (the imaginary part of refractive index) of the filter by 4-9 orders of magnitude depending on the wavelength of the light and the materials of the SLF. This phase transition effect may dramatically block unwanted light.

The second nano-coating may include a polymer film containing carbon nano-tubes (CNT), fullerenes, for example, "buckyballs" which in some embodiments may include 60, 70, 74, 80 or other numbers of carbon atoms each, and/or graphenes forming a polymer/carbon allotrope nano-coating 120. The second nano-coating may be thicker than the first nano-coating. The second nano-coating may also transmit operational signal(s), for example, infrared operational signals, and block unwanted light beams, for example, light beams having undesired frequencies and/or intensities. The second nano-coating and/or the first nano-coating may be formed of materials and with dimensions to preferentially block light radiation in the one micron band, for example, light having a wavelength of about 1,064 nm and/or about 1,030 nm and/or laser frequencies consistent with the output of lasers which may be used in military defense applications, for example, a yttrium aluminum garnet (YAG)-based laser. The concentration of constituent fillers and properties of a polymer matrix carrier in the second nano-coating may be selected to employ saturable absorption and scattering mechanisms to block unwanted radiation which hits the coating.

CNT products, including single wall and multi-wall nano-fillers may exhibit dynamic and electro-phoretic scattering that is characterized by the polydispersity of CNT aggregates and nano-dispersity of individual CNTs. The dimensional and mass parameters of a particular CNT filler constituent may affect the above polydispersity and nano-dispersity and in turn the nonlinear saturation scattering. In some embodiments of a polymer/carbon allotrope nano-coating which reacts to light in the one micron band, the size of CNT fillers may be characterized by a near Gaussian distribution centered at about one μm with a weight concentration in the polymer/carbon allotrope nano-coating of between about 0.5% and about 2%. For different polymers in the polymer/carbon allotrope nano-coating, the mass parameters of the carbon allotropes may be modified to achieve a coating reactive to a desired frequency of optical radiation. For multi-walled nano-tubes having different numbers of walls, the dimensional and mass parameters of nano-scattering tubes may be different for the same polymer matrix to achieve a desired degree of reaction to a desired frequency of optical radiation. For fullerenes and graphenes the nonlinear saturable absorption of light becomes the major limiting mechanism. The nonlinear saturable absorption of fullerenes and graphenes may be characterized by a two-photon exchange mode. The carbon allotropes may provide an ultrafast limiting effect which may occur on a time scale much shorter than that for a metal nano-coating. This ultrafast response may be desirable for the laser hardening of different sensors.

A fullerene filled polymer may form a conjugated polymer-fullerene heterojunction network that may be sufficient for photo-electron transfer between the donor-polymer and the acceptor-fullerene. The photo-excited species are dissociated at the polymer-fullerene film composite at relatively small concentrations. These concentrations may vary for different fullerene allotropes (allotropes having different numbers of carbon atoms) and for different polymer matrixes. For example, a concentration of C60 fullerene impregnated into epoxy oligomers may be greater than about 0% and less than about 2% by mass to provide satisfactory optical response. In the case of graphene absorbers, the desired concentration may vary depending of the texture, for example, the size distribution of the flakes, the number of actual layers, and the degree of folding of the graphenes. In some embodiments including two nano-fillers, for example, graphene and fullerene fillers, satisfactory results may be obtained with a total carbon allotrope concentration of above about 0% and below about 2% by mass. The planar dimensional parameters of graphene flakes may be established to exhibit a desired van Hove peak in absorption. For example, for absorption of optical radiation in the one micron band, graphene flakes having a characteristic dimension, for example, a diameter of between about 1.5 microns and about three microns may provide a desired level of performance.

Embodiments of an SLF as disclosed herein may also include a spectral shaping stack coating (SSSC) of alternated low and high refraction dielectric film materials that may be added to the SLF substrate if desired. Embodiments of an SSSC may provide for a better imaging when used with certain image sensors. The SSSC may spectrally modify an operational signal facilitating compatibility with certain commercially available sensors. Embodiments of an SSSC may include a plurality of dielectric films having the alternated refractivity (low and high).

In some embodiments, essentially different light blocking mechanisms in the metal nano-coating and in the polymer/carbon allotrope nano-coating can effectively limit and block different laser threats to an optical sensor. Efficient light absorption, scattering, and phase conversion mechanisms may form highly localized heat fluxes which may thermally damage the nano-coatings and/or the substrate(s) of embodiments of the filter. Some embodiments of the filter may employ inexpensive substrate and coating materials. It may thus be economically feasible for embodiments of the filter to be sacrificial and to be replaced after a desired number of uses. An inexpensive SLF in accordance with embodiments of the present invention may be used several times until the reduced amount of information associated with partly damaged pixels will affect the image taking and analysis processes.

The deposition processes for the metal nano-coating may include physical vapor deposition processes such as used in semiconductor device fabrication, for example, evaporative deposition, electron beam physical vapor deposition, or sputtering. The deposition process may result in the formation of metal clusters having electromagnetic, thermal, and mechanical characteristics that differ substantially from their bulk forms. In some embodiments it may be desirable that the thickness of deposited metal in the metal nano-coating should not exceed the mean free path of photons of certain wavelengths and/or phonons in the film (typically about 100 nm). In metal coatings of such thicknesses, the optical transmission of the metal coating may depend on thickness in essentially non-linear manner, depending on numerous factors associated with the physical properties of conductive alloys, their clustered morphology, and film thickness. In addition to these parameters, the special properties of short ballistic-type conductors interfacing dielectrics may also contribute to optical transmission in different bands. Among these special properties are the ability to generate surface plasmons and to provide for ballistic conductivity/resistivity. In particular, optical transmission and heat generation differ dramatically in resonant and resonant-free bands. Inclusion of certain features in the metal nano-coating, for example, specific types of patterning may be used for tuning the metal nano-coating to selectively respond to certain resonant bands.

Embodiments of SLFs may include glass substrate(s) and nano-coating films. One of these films may include a sacrificial neutral optical density metal cluster nano-coating. Metal included in or forming the metal cluster nano-coating may be a eutectic alloy having low temperature solidus of from about 70° C. to about 200° C. The filter may also include a contour metallization lead-frame. The metal cluster nano-coating can be selectively tuned to certain operational and blocking bands, to transmit, for example, infrared operational signal(s) and block unwanted light. Metallurgical transformations of the metal cluster nano-coating may not be instantaneous. In some embodiments the blocking of unwanted light due to the metallurgical transformation of the metal clustered nano-coating can be achieved within about 10 milliseconds (ms).

A second coating included in embodiments of an SLF may be a thicker polymer film filled with CNT, fullerenes, or graphenes at desired concentrations. The fullerenes, CNT, and graphene nano-fillers and the polymer matrix in which they are embedded may form a polymer/carbon allotrope filmed coating. The time response to an applied optical signal in embodiments of the polymer/carbon allotrope coating may be ultrafast because the scattering and absorption mechanisms in nano-clustered carbon allotropes may occur on a femtosecond time scale.

FIG. 1 illustrates an embodiment of an SLF, generally indicated at 100. An inexpensive glass substrate 110, for example a BK-7 type glass slide, is coated by two films 120, 130. The substrate 110 may alternatively include or be formed from one or more of borosilicate glass, fused silica, or of a polymer, for example, acetate or polyamide. A first surface, for example, a front surface of the substrate 110 may be coated by a polymer film 120 having uniformly distributed carbon nano-fillers, including, for example, carbon nano-tubes (CNTs), fullerenes, and/or graphene fillers forming a polymer/carbon allotrope film. A second surface, for example, a rear surface of the SLF 100 of FIG. 1 may be coated with a metal nano-coating 130.

The polymer/carbon allotrope film 120 may be, for example, from about one to about 10 microns thick. The polymer/carbon allotrope film 120 may transmit infrared operational signals having wavelengths of, for example, between about two and about eight microns at between about a 60% and about an 85% level and block unwanted light beams, for example, light having a wavelength in the one micron band, with an attenuation of about 99% or greater. The concentration of constituent fillers and properties of polymer matrix carrier may be selected to employ saturable absorption and scattering mechanisms when the unwanted radiation hits the filter film. The polymer matrix may include one or more of any of a number of suitable polymers, for example, acetate or dendrite epoxy oligomers. Dendrite epoxy oligomers form dendrite type submicron cells of nearly uniform micro-dimensions, providing for the carbon fillers to be distributed uniformly within the cell-based coating film. The blocking/limiting response in the polymer/carbon allotrope film 120 may be ultrafast. For example, the optical scattering and absorption mechanisms of nano-clustered carbon allotropes which may be included in the polymer/carbon allotrope film 120 may occur on femtosecond timescales, rendering the time response of a filter including a polymer/carbon allotrope film as disclosed herein ultrafast.

The concentration of constituent fillers and properties of the polymer matrix carrier in the polymer/carbon allotrope film 120 may be selected to exhibit non-linear saturable optical absorption and scattering mechanisms when unwanted optical radiation hits the filter. The nonlinear optical properties of the carbon allotropes, including fullerenes, CNT, and graphene, may differ by their micro-mechanisms. For example, the CNT fillers may exhibit nonlinear scattering, while the fullerenes clusters exhibit excited state absorption nonlinearity. The graphene constituent may exhibit both nonlinear scattering and two-photon-absorption mechanisms or primarily two-photon-absorption mechanisms. The graphene allotropes, including multiple sheet flake films which may include graphene oxides also exhibit different type nonlinearity affecting limiting primarily at short pulses. The fullerenes, CNT, and graphene nano-fillers may each exhibit similar optical transmissions of between about 70% and about 80% for operational signals having wavelengths of, for example, between about two and about eight microns.

Various embodiments of a polymer/carbon allotrope film 120 may be characterized by different ratios of nano-fillers. A desired concentration of the nano-fillers may be selected to provide a desired level of saturable absorption and optical scattering. In some embodiments, the sum of all the carbon allotropes in the polymer/carbon allotrope film 120 does not exceed about 2% by weight of the polymer/carbon allotrope film 120. In particular embodiments, depending on the response criteria, the ratio of fullerenes, for example, C60 fullerenes, CNT, and graphene constituents can vary as (0.2-0.5):(1-1.4):(0.1-0.5) by weight.

The opposite surface (the rear side) of the SLF 100 of FIG. 1 may be coated with a metal coating material forming a metal nano-coating 130 which exhibits low-temperature eutecticity. Suitable metal coating materials may include low-melting temperature In- or Bi-based soldering alloys, for example, alloys from the Bi—Pb—Sn—Cd, Bi—In, Bi—Sn—Pb, and In—Bi—Cd binary and ternary families. In some embodiments, the thickness of the metal coating does not exceed the mean free path of electrons and/or photons in the metal coating, which in some embodiments is about 100 nm. The thickness, morphology, and composition of the metal coating may be selected such that plasmonic resonance may occur at a desired level of incident laser beam power. The phase transition can be triggered at the solidus temperature of the metal nano-coating 130 which can be as low as between about 70° C. and about 85° C. or lower. In some embodiments, the solidus temperature of the metal nano-coating 130 does not exceed 200° C.

In some embodiments, metal nano-coatings may be selectively tuned to certain bands. For example, metal nano-coatings in accordance with some embodiments may include patterning, for example, a grating structure similar to one or more of those disclosed in U.S. Patent Application Publication No. 2008/0217542. Dimensions of the grating structure or structures and/or dimensions of the metal nano-coatings as a whole may be selected using methods known in the art to selectively induce high intensity plasmon generation at one or more desired frequencies of incident radiation. Tuning of the metal nano-coatings may include selection of a particular patterning and a particular degree of preheating to be applied to the metal nano-coatings. The patterning contours combined with a precisely selected thickness may provide desired field intensification and periodic localizations, so the desirable thermal flux can be tuned to a level sufficient for the melting and phase transition.

In some embodiments, the metal nano-coating may include a micro- and/or macro-patterning so the plasmon resonance magnitudes can be increased as compared to a non-patterned nano-coating. The patterning may be formed by lithographic techniques and/or chemical etching and/or other methods. The patterns may include dual-periodic systems of rounded or linear segments. The patterns may be open and may be symmetrical. Examples of various shapes of patterning which may be applied to the metal nano-coating are illustrated in FIGS. 2A-2D.

The metal nano-coating 130 may also include contour metallization that can be used to further facilitate the plasmonic resonance and facilitate secondary preheating of the metal nano-coating. The contour metallization may include side metallization covering a portion or the entirety of opposite edges of the metal nano-coating film. The contour metallization may be fabricated from conducting metals and/or alloys and may comprise a lead frame electrically connected the eutectic metal nano-coating. The lead frame may conduct current to and through the metal nano-coating and provide for resistive preheating of the metal nano-coating. This preheating may further facilitate the phase transition of the metal nano-coating when exposed to unwanted optical radiation. In some embodiments, the contour metallization may include, for example, resistive wires of a metal, for example copper, through which current may be passed to heat the wires. Heat from the heated wires may be transferred to the metal nano-coating 130 and/or substrate 110 to pre-heat the metal nano-coating 130 and/or substrate 110. The pre-heat temperature may be as low as, for example, between about 30° C. and about 40° C.

Figure 12:
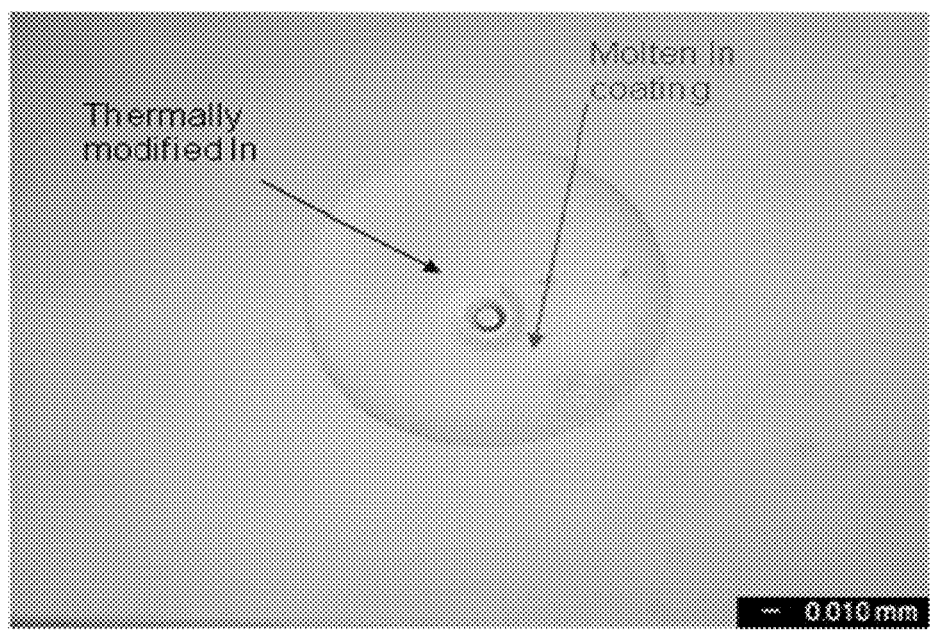
FIG. 12 is a scanning electron microscopy image of an In-based nano-coating after subjected to laser irradiation at 532 nm.
Figure 15:
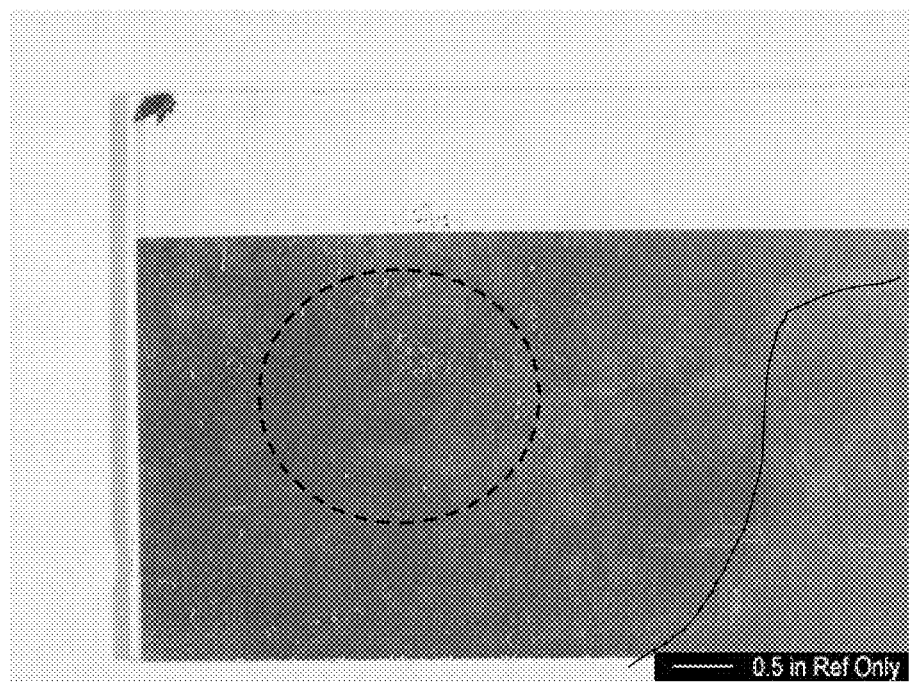
FIG. 15 is an image of the coated glass substrate of FIG. 14 after irradiation with damaging laser radiation.
Figure 16:
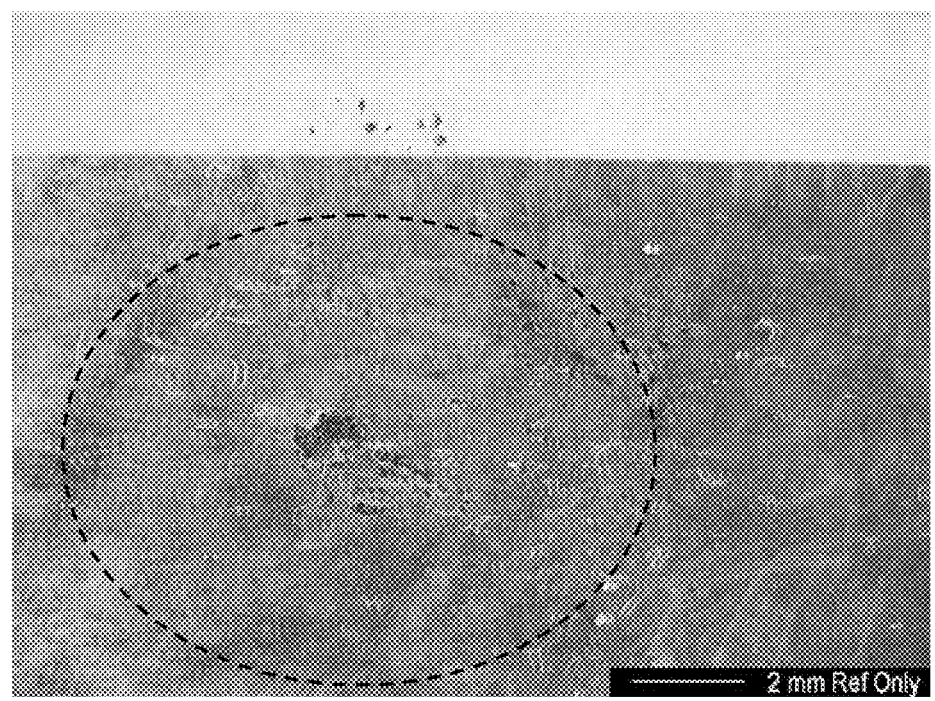
FIG. 16 is an enlarged image of a portion of the image of FIG. 15.

External current passed through the metal nano-coating 130 and/or the contour metallization and/or unwanted light beams may generate surface plasmons in the metal nano-coating 130. The induced plasmon resonance may in turn trigger resonating electric currents and ballistic conductivity mechanisms which may result in a temperature elevation in the metal nano-coating 130. The temperature elevation may cause the temperature of the metal nano-coating 130 to quickly approach the solidus temperature of the metal nano-coating 130. When the temperature of the metal nano-coating 130 reaches the solidus the metal nano-coating 130 may undergo a phase transition and melt into a liquid. The metal nano-coating 130 may subsequently resolidify into a crystalline form. The phase transition and eutectic melting of metal nano-coating 130 with its subsequent crystallization may facilitate the blocking/limiting of unwanted light beams. The recrystallized metal nano-coating 130 may undergo morphology changes and/or become pitted, as illustrated in FIGS. 12, 15, and 16. These changes may result in a reduced transmission of light through the metal nano-coating 130 by, for example, increasing the scattering of light passing through the metal nano-coating 130. Phase transition processes in the metal nano-coating 130 may lead to a dramatic increase in the optical absorption coefficient of the metal nano-coating 130.

Optionally, the SLF can also include a spectral shaping stack coating (SSSC) of alternating coated layers of low and high reflectivity dielectric film materials. These dielectric coatings can be deposited along with the metal nano-coating 130. The dielectric coatings may be selected to minimize thermal mismatch between other materials in the SLF, for example, oxide coating materials or substrates and eutectic alloys. Various electro-optical sensors and CCD cameras may be designed for certain commercial bands of light. An operational signal reflected from, for example, ground objects, tactical sources, and/or landscape, may desirably be pre-processed, for example to provide gain flattening, spectral shaping, or some other functions with, for example, an SSSC. Embodiments of an SLF may be a suitable component for this pre-processing of operational signal combined with laser hardening/protection in different bands.

Embodiments of the filter may be sacrificial due to the localized thermal damage of coated film exposed to unwanted optical radiation. However, embodiments of the filter may be used several times until the reduced amount of information transmitted through the filter to, for example, a CCD camera or other sensor may affect the image taking process. In some embodiments a filter as disclosed herein may be exposed to unwanted radiation and sustain irreversible damage up to 100 times or more and still be capable of transmitting up to about 96% of the information which could be transmitted through a new, undamaged filter. This feature may make an SLF as disclosed herein especially desirable for battlefield uses where an optical sensor may be exposed to multiple hits of unwanted radiation before having an opportunity to be serviced.

Figure 17:
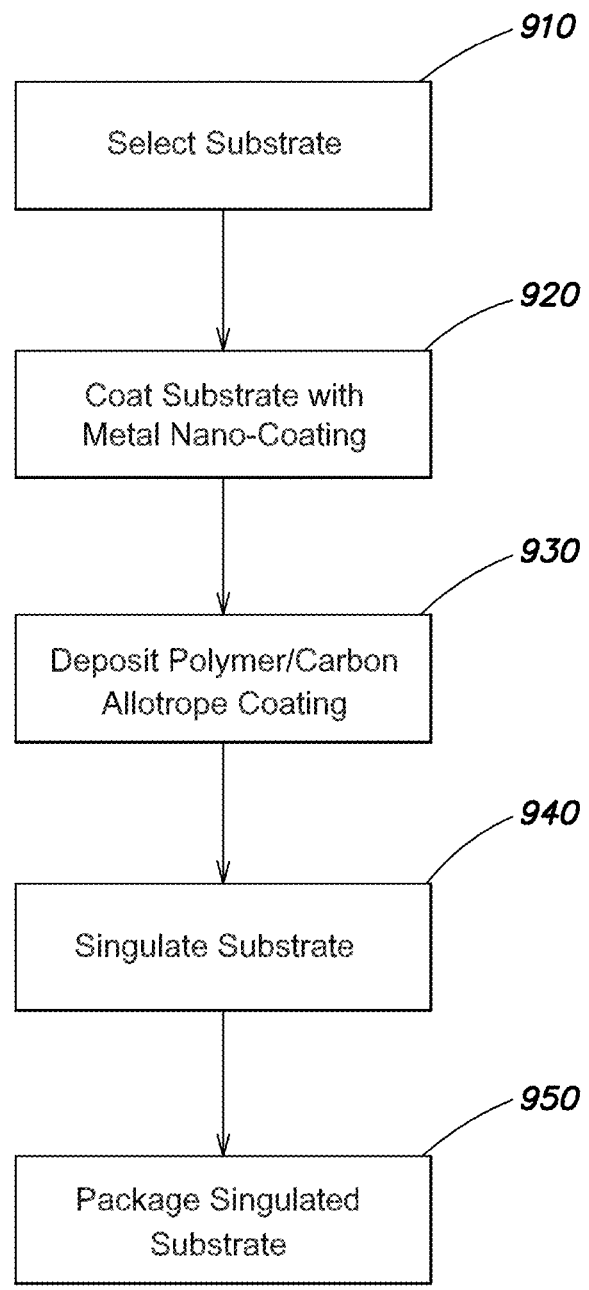
FIG. 17 is a flowchart of an example of a method of fabricating an SLF in accord with aspects of the present invention.

An embodiment of a method for fabricating a filter as disclosed herein is illustrated generally at 900 in FIG. 17. A first act in the method, act 910, may include selecting a substrate 110 for the SLF. As described above, the substrate may be glass, a polymer film, or any other material which is substantially or completely transparent to wavelengths of operational signals of interest. In act 920 a eutectic metal alloy may be deposited on the substrate 110 to form the metal nano-coating. Conventional physical vapor deposition processes such as evaporative deposition or sputtering techniques may be used to deposit the eutectic metal alloy on the substrate 110. In some embodiments, the substrate 110 may be pre-treated prior to deposition, for example, activated to enhance the adhesion of the metal nano-coating 130. Activation may involve, for example, exposure of the substrate 110 to a nitrogen plasma. Other commercial activation methods affecting wetting ability of metal on the substrate may also or alternatively be used as desired.

The deposition rate and thickness of the metal nano-coating 130 may be selected to achieve a desired optical density of the metal nano-coating 130 and a desired thermal response to incidence of a relatively weak power beam of unwanted radiation. The deposition rate may be in a range of, for example, from about four Å/second to about 16 Å/second. The optical density of the metal nano-coating 130 may depend non-linearly on its thickness. For example, some indium-based alloys are nearly zero-density filters at coating thicknesses not exceeding about 20 nm. The optical density then increases up to nearly 90% at coating thicknesses exceeding about 60 nm. A high deposition rate may reduce the density of the metal nano-coating 130 as compared to a metal nano-coating 130 formed with a lower deposition rate. The density and structure of the deposited metal nano-coating 130 may affect the optical density and thermal characteristics of the film. For example, a less dense metal nano-coating 130 having many micro-voids may not heat as quickly or transmit heat as readily as a more dense metal nano-coating 130 having fewer or smaller micro-voids.

For any particular alloy used in the metal nano-coating 130, samples of various film thicknesses may be prepared are then tested by lasing and checking for evidence of phase transition and laser damage at a certain power of incident radiation. The results of these tests may be used for optimization of coating thickness, optical density and deposition rate parameters.

In a next act of the method of FIG. 17 (act 930), a polymer/carbon allotrope coating 120 may be formed on the opposite side of the substrate 110 from the metal nano-coating 130. The polymer/carbon allotrope coating 120 may be deposited by spin deposition of a polymer having clustered carbon allotropes included therein onto the substrate or onto a previously deposited metal nano-coating. The spin deposition process may be similar to a spin deposition process conventionally used to deposit microlithography photoresist on a semiconductor wafer. The spin deposition operation may be followed by gelation and curing operations. If the metal nono-coating 130 has been previously deposited on the substrate 110, the cure temperature may be limited by the solidus of the metal nano-coating 130. Thus, in some embodiments, it may be desirable that the polymer or polymers selected are chemically curable or curable at relatively low temperatures, for example, at a temperature below the solidus of an alloy in the metal nano-coating 130.

In some embodiments, the polymer/carbon allotrope coating 120 may be formed on the same side of the substrate 110 as the metal nano-coating 130. In some embodiments, the polymer/carbon allotrope coating 120 may be deposited prior to the metal nano-coating 130. In some embodiments, the metal nano-coating 130 may be formed on top of the polymer/carbon allotrope coating 120.

In act 940, the substrate may be singulated if necessary. For example, if the metal nano-coating 130 and/or polymer/carbon allotrope coating 120 are deposited on a substrate larger than needed for a single SLF, the substrate may be diced or cut into portions having sizes appropriate for individual SLFs.

In act 950 the substrate with the metal nano-coating 130 and/or polymer/carbon allotrope coating 120 applied may be packaged. This packaging may include mounting the substrate in a carrier and/or providing a contour metallization lead-frame in electrical contact with portions of the metal nano-coating 130.

Various embodiments of the method of FIG. 17 may be performed with the disclosed acts performed in different orders. For example, in some embodiments, a substrate may be singulated prior to the deposition of the metal nano-coating 130 and/or polymer/carbon allotrope coating 120. Further, in various embodiments, additional or alternative acts may be performed and/or one or more of the disclosed acts may be omitted.

Figure 3:
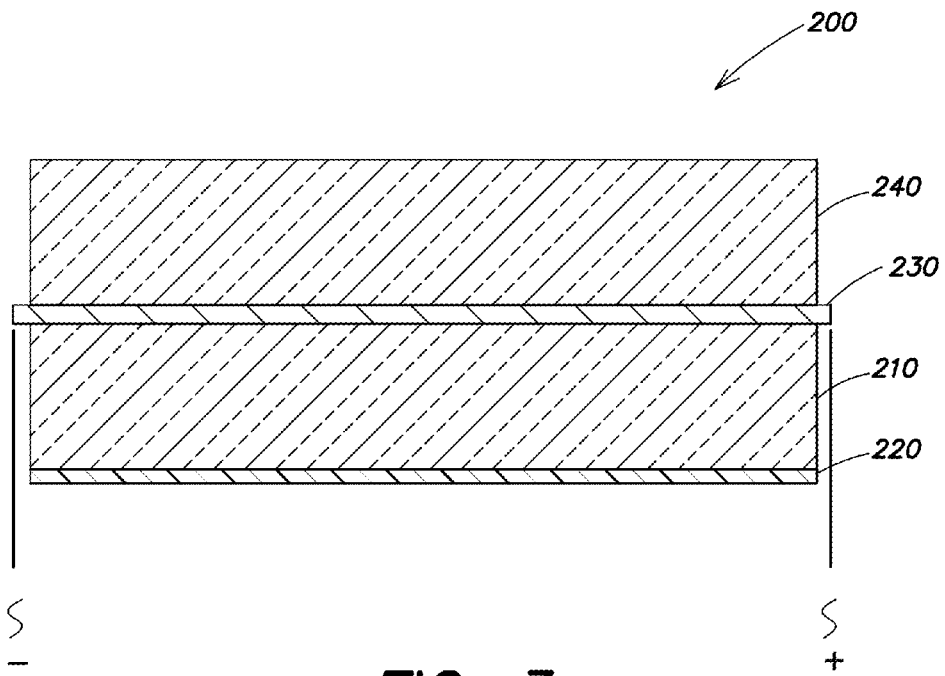
FIG. 3 is another example of a sacrificial limiter filter in accord with aspects of the present invention.

FIG. 3 illustrates a second embodiment of an SLF 200 in accordance with the present disclosure. In this embodiment, the metal nano-coating 230 is positioned between two substrates 210, 240, so the frontal substrate 240 can protect the metal nano-coating 230 from rain drop erosion or other adverse environmental effects. As in the embodiment described above, the substrates 210, 240 may be formed of glass, for example, BK7 glass, borosilicate glass, or fused silica, or of a polymer such as acetate or polyamide. The polymer/carbon allotrope coating 220 is positioned on the opposite side of one of the substrates from the metal nano-coating 230. In this embodiment, the rear substrate 210 to which both the metal nano-coating 230 and the polymer/carbon allotrope coating 220 are adhered experiences heat fluxes generated from two sources, while the frontal substrate 240 is nearly insulated from the polymer/carbon allotrope coating 220. This embodiment may be especially applicable for use in aircraft where protection of the coatings from the environment may be desired. In various aspects this second embodiment may also incorporate the various design features described above with reference to the first embodiment. The polymer/carbon allotrope coating 220 and metal nano-coating 230 may be formed of similar materials and dimensions and by similar processes as the polymer/carbon allotrope coating 120 and metal nano-coating 130 described above.

Figure 4:
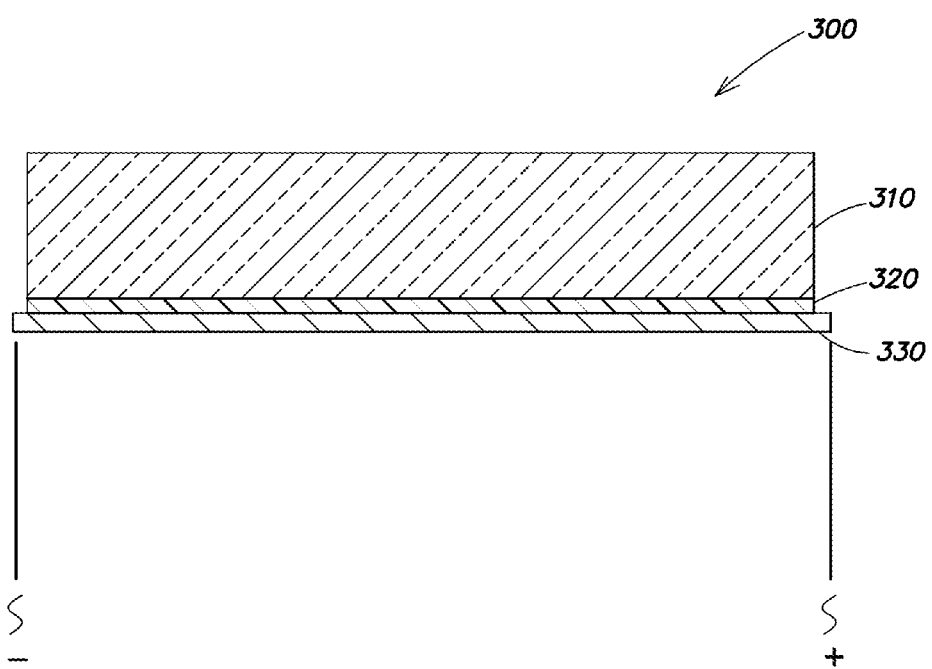
FIG. 4 is another example of a sacrificial limiter filter in accord with aspects of the present invention.

FIG. 4 illustrates a third embodiment of an SLF 300 in accordance with the present disclosure. In this embodiment, the metal nano-coating 330 and the polymer/carbon allotrope coating 320 are deposited sequentially on the back side of a substrate 310. The polymer/carbon allotrope coating 320 may be formed either between the substrate 310 and the metal nano-coating 330 as illustrated, or or atop the metal nano-coating 330. A forward surface of the metal nano-coating 330 may be directly adhered to a back surface of the polymer/carbon allotrope coating 320 or a back surface of the metal nano-coating 330 may be directly adhered to a front surface of the polymer/carbon allotrope coating 320. As in the embodiments described above, the embodiment of FIG. 4 combines ultrafast response in the polymer/carbon allotrope coating 320 with a relatively slow phase transition in the metal nano-coating 330. It also combines the generated heat fluxes, so the ultrafast response of the polymer/carbon allotrope coating 320 may preheat the metal nano-coating 330. In various aspects this third embodiment may also incorporate the various design features described above with reference to the first and second embodiments. The polymer/carbon allotrope coating 320 and metal nano-coating 330 may be formed of similar materials and dimensions and by similar processes as the polymer/carbon allotrope coating 120 and metal nano-coating 130 described above.

In the above embodiments Bi—Pb—Sn—Cd, Bi—In, Bi—Sn—Pb, and In—Bi—Cd eutectic alloys may be used, individually or in combination, as coating materials for forming the metal nano-coating. Each of these alloys exhibit a low temperature phase transition from solid to liquid phase at their eutectic composition. These eutectic alloys are characterized by a low temperature solidus at temperatures ranging from about 70° C. to about 200° C. Relatively limited heat flux generation may be required to induce low temperature melting in small spots in films formed of these alloys. These alloys, therefore, can be used to form a metal nano-coating suitable for a weak laser signal hardening, for example for hardening agains laser signals having a power of about one W or less. Several other binary and ternary systems, for example, some alloys from the Bi—Pb—Sn—Cd, Bi—In, Bi—Sn—Pb, and In—Bi—Cd eutectic alloy families may be appropriate to address higher energy optical radiation, for example, having energies in the range of from about one to about 10 W or greater.

Figure 5:
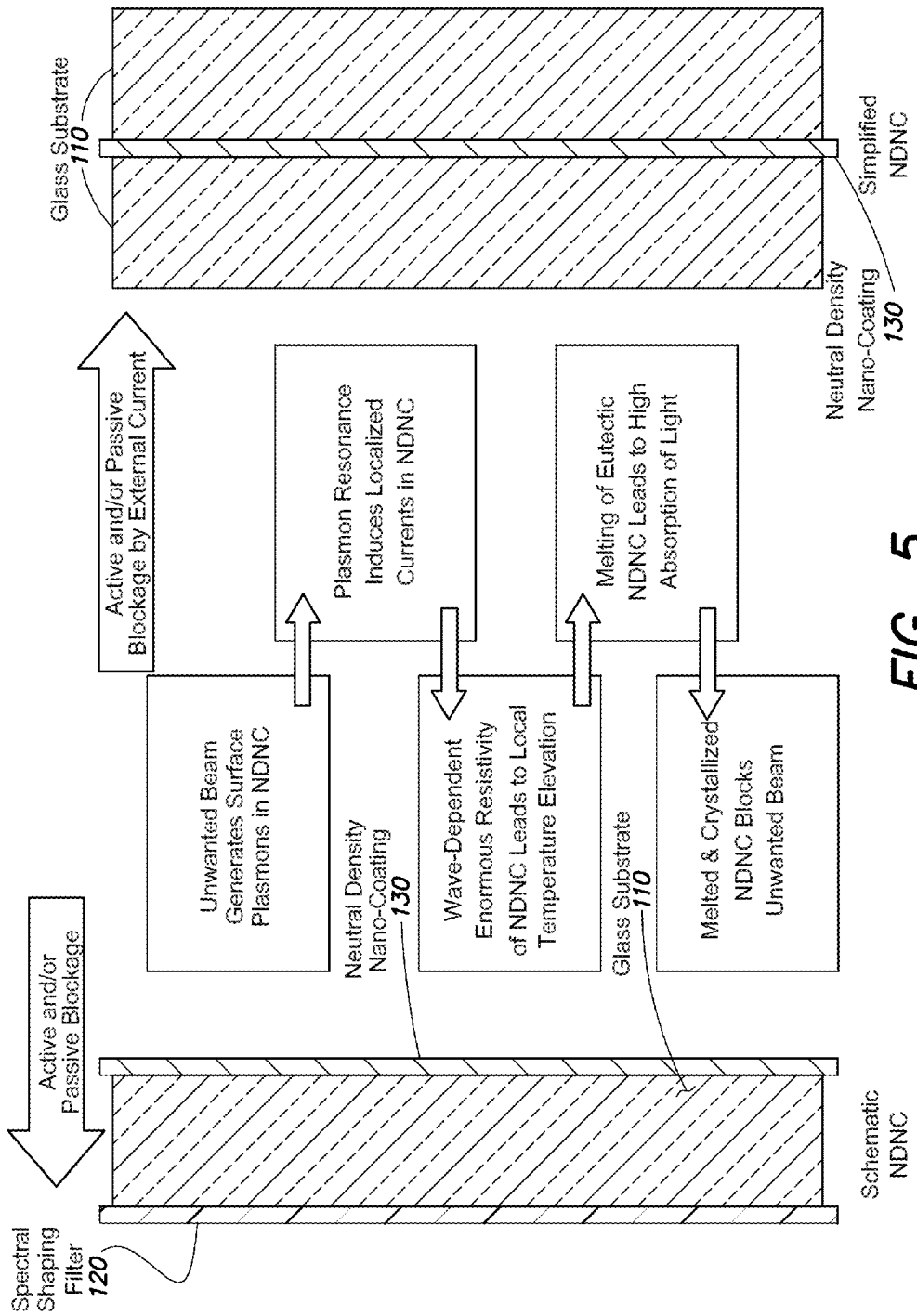
FIG. 5 is a schematic of operations of a sacrificial limiter filter in accord with aspects of the present invention.

FIG. 5 details an example of the functioning of a simplified embodiment of an SLF including a substrate and an optically neutral density metal nano-coating but no polymer/carbon allotrope coating. The metal neutral density nano-coating (NDNC) provides active (with additional electric current) or passive blocking of unwanted radiation. An unwanted incident laser beam may generate surface plasmons in the NDNC. Plasmon resonance in turn may induce localized electrical currents in the NDNC. The deposited metal nano-coating may be characterized by a high electrical resistivity. The ballistic resistivity may be wave (or frequency) dependent. The magnitude of the field localizations may depend on the coating thickness and the wavelength of the unwanted radiation. The induced localized electrical currents may lead to local temperature elevation. The heat flux generated may melt at least a portion of the eutectic film of NDNC, resulting in a higher absorption of light in the NDNC. The melted and re-crystallized NDNC may at least partially or completely block the unwanted beam.

Figure 6:
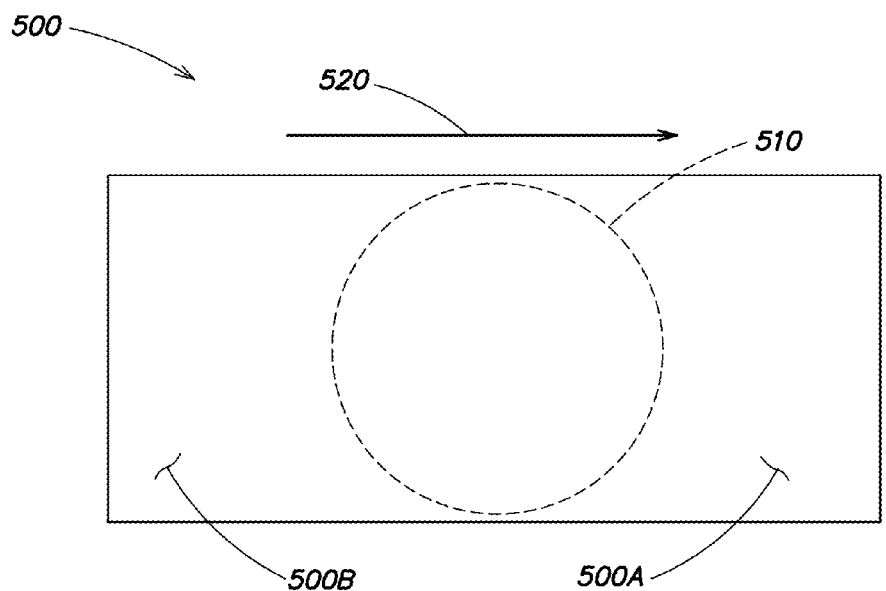
FIG. 6 is an example of an arrangement of an SLF relative to an aperture of an imaging device in accord with aspects of the present invention.
Figure 7:
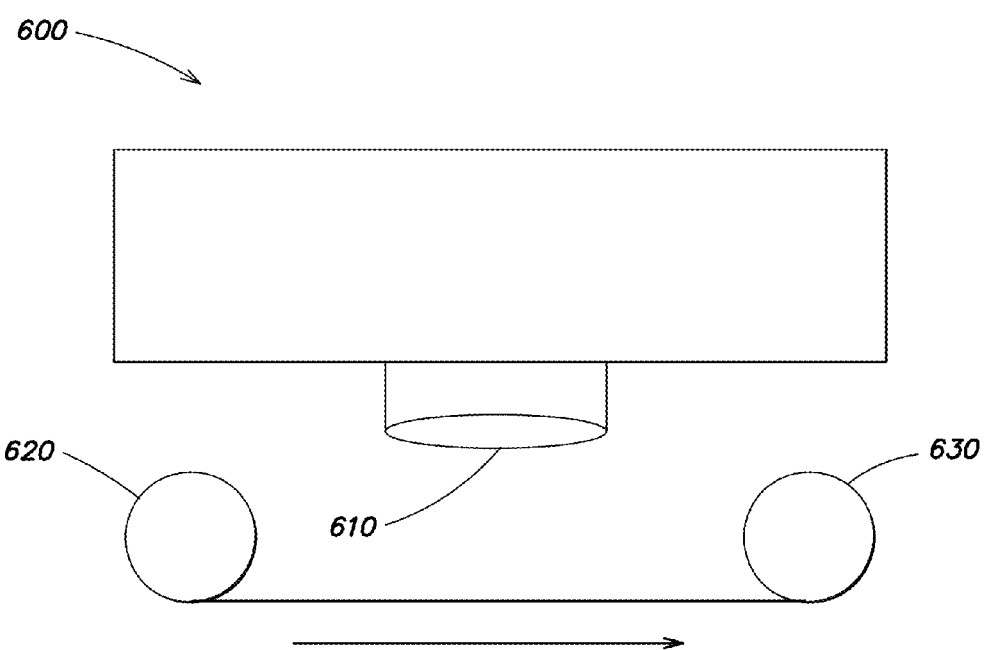
FIG. 7 is an example of an arrangement of an SLF relative to an aperture of an imaging device in accord with aspects of the present invention.

In some embodiments translational or rotational mechanisms can be used to position different areas of an SLF in the optical paths of operational and/or unwanted laser beams. As one area of the SLF becomes damaged due to the absorption of unwanted radiation a different portion of the SLF may be moved into position in front of, for example, an aperture of a camera or optical sensor which the SLF is protecting. In one embodiment, as illustrated in FIG. 6, an SLF 500 may be formed in a shape such as a rectangle or other shape having at least one axis longer than a diameter or width of an aperture 510 of a detector the SLF is intended to protect. As a portion 500A of the SLF becomes damaged with use, the SLF may be linearly displaced, for example in the direction indicated by the arrow 520 such that a new undamaged portion 500B of the SLF 500 is positioned in front of the aperture 510. In some embodiments, such as illustrated in FIG. 7, an SLF 600 may be formed with a polymer film substrate and may be rolled like a roll of photographic camera film. As a portion of the SLF 600 is damaged during use the film may be unrolled from a spool of fresh SLF film 620 and positioned in front of an aperture 610 of an optical sensor which it is intended to protect while the damaged SLF film rolled onto a damaged film spool 630.

Figure 8:
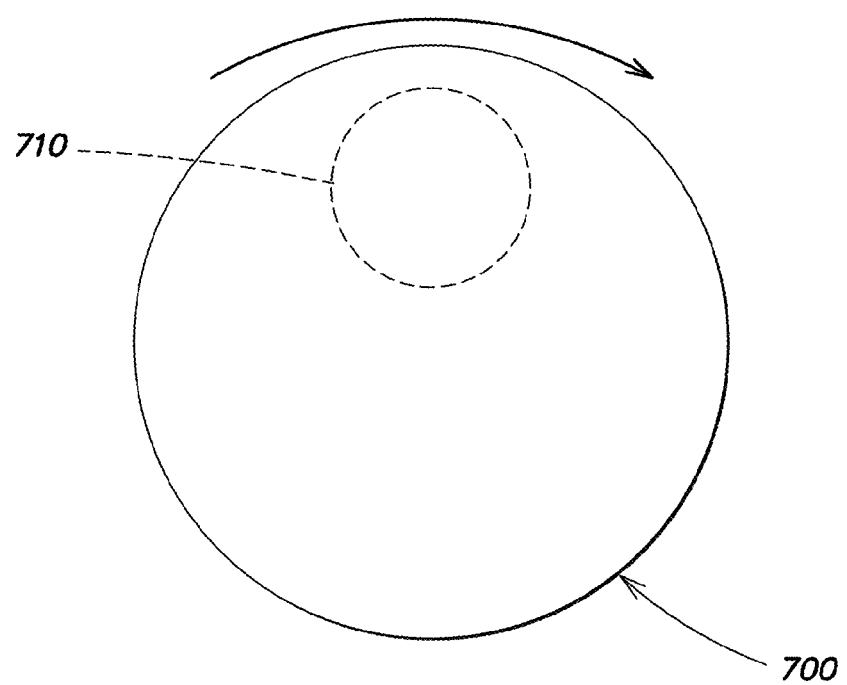
FIG. 8 is an example of an arrangement of an SLF relative to an aperture of an imaging device in accord with aspects of the present invention.

In a further embodiment illustrated in FIG. 8, an SLF 700 may be formed as a disc or a number of discreet segments positioned on a rotatable carrier. The SLF disc 700 may be placed in front of an aperture 710 of an optical sensor the SLF is intended to protect. As a portion or segment of the SLF disc becomes damaged during use, the disc may be rotated to position a fresh undamaged portion of the SLF disc 700 in front of the aperture 710.

In further embodiments a combination of horizontal, vertical, and/or rotational displacement may be utilized to move damaged portions of an SLF out of a path of light into an optical detector and fresh undamaged portions of the SLF into the path of light.

EXAMPLES

The function and advantages of various embodiments will be more fully understood from the following non-limiting examples. These examples are intended to be illustrative in nature and are not to be considered as limiting the scope of the embodiments discussed herein.

Example 1

Figure 9:
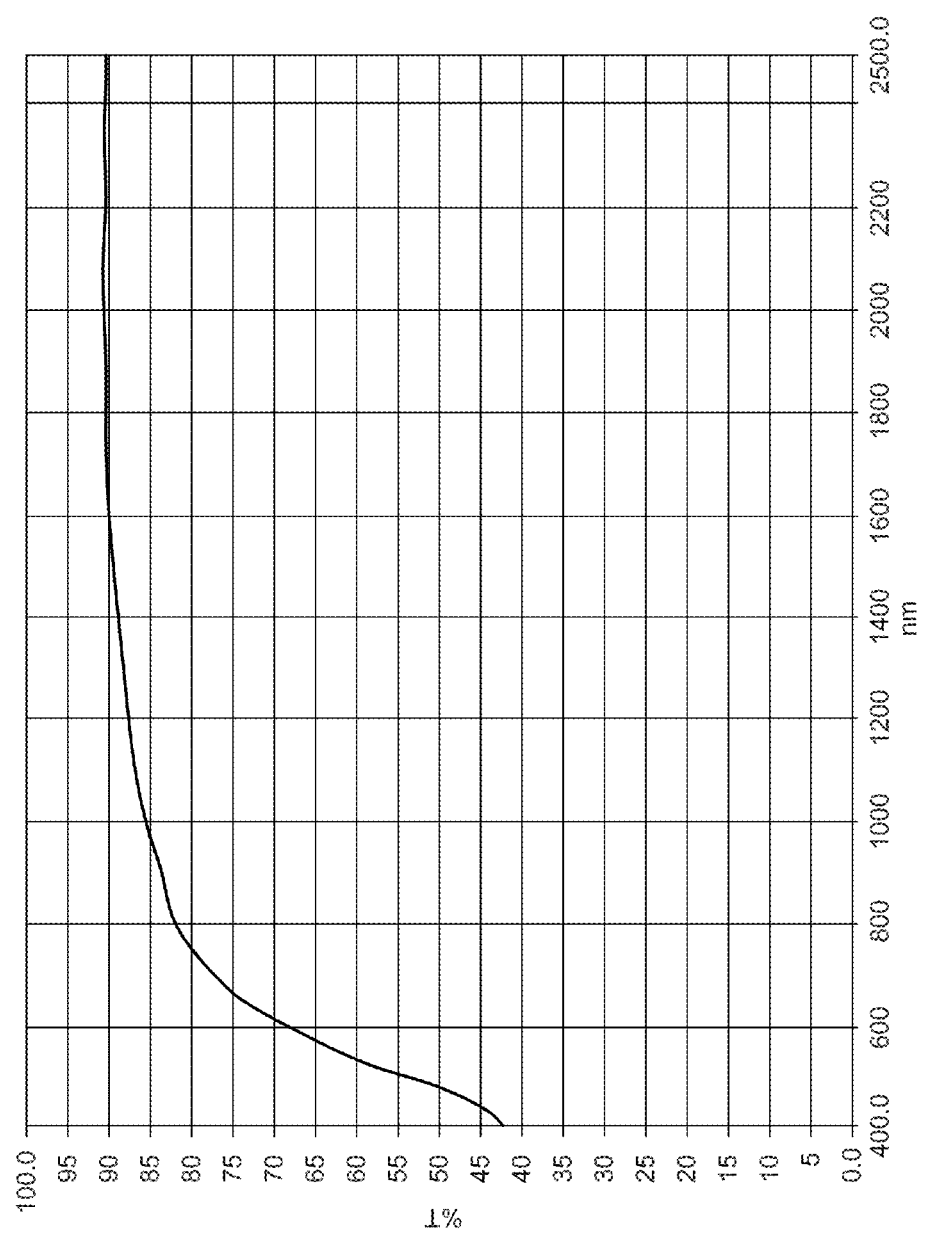
FIG. 9 is a chart of optical transmission for a nano-film of In-based eutectic alloy in the 400 nm to 2,000 nm band.
Figure 10:
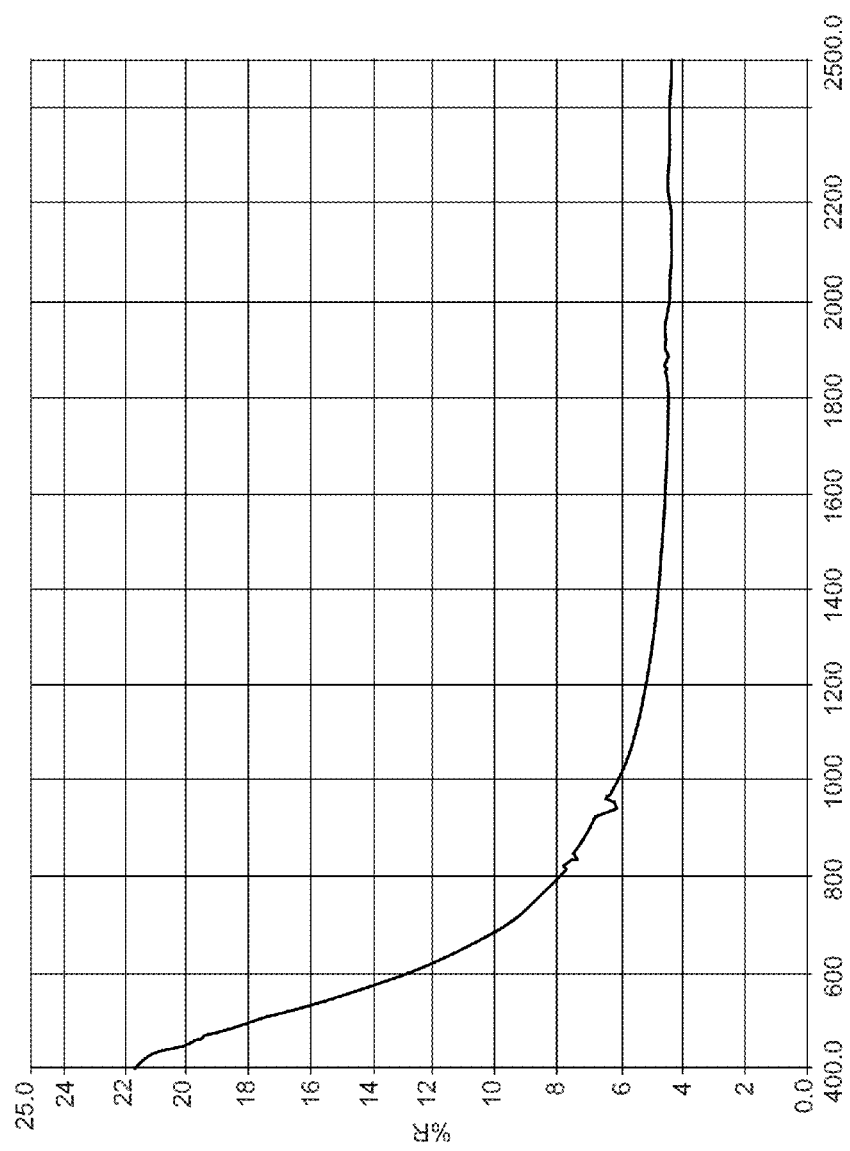
FIG. 10 is a chart of optical absoption for a nano-film of In-based eutectic alloy in the 400 nm to 2,000 nm band.

The following example illustrates experimental optimization of the coating thickness. The transmission/reflection characteristics of a 34 nm neutral density thin film of In-based eutectic alloy is illustrated in FIGS. 9 and 10. FIG. 9 illustrates the transmission for the In-based eutectic alloy meal nano-film in a 400-2,000 nm band. FIG. 10 details its reflection in the same band.

Example 2

Figure 11:
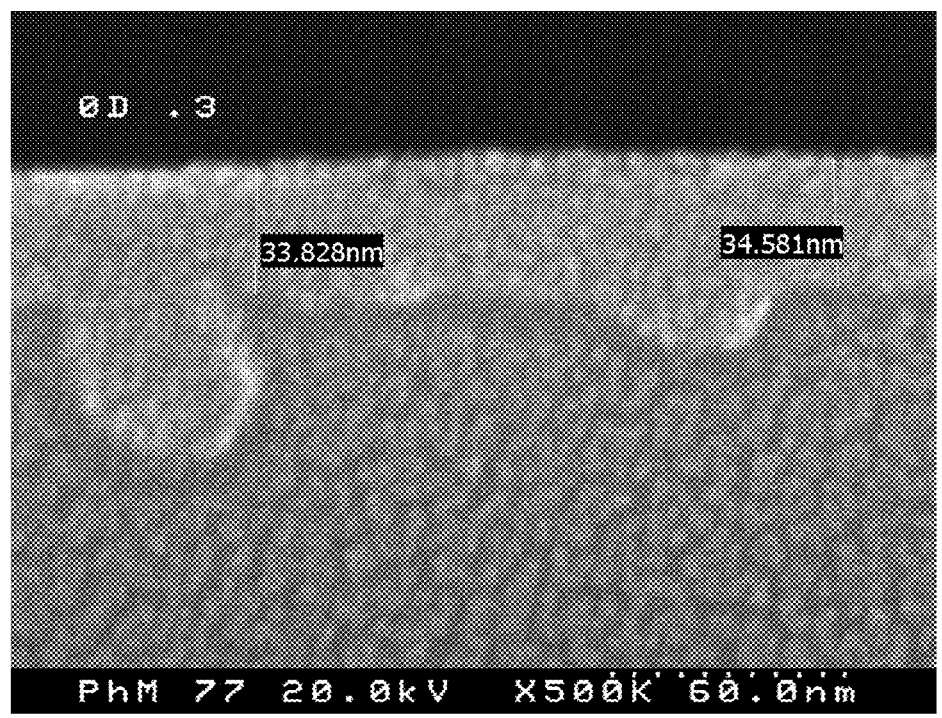
FIG. 11 is a scanning electron microscopy image of a metal nano-coating formed in accordance with aspects of the present invention.

FIG. 11 is a SEM image of a metal nano-coating as described above. An In-based eutectic coating was deposited by electron beam assisted evaporative deposition on a fused silica glass substrate in an evacuated environment. The deposition rate was about 4 Å/s. The precisely controlled coating thickness varied from about 33.5 nm to about 34.5 nm. The SEM image of FIG. 11 was taken at 500× magnification. The clustered formation of the alloy nano-particles, as well the variation in thickness of the deposited coating may be observed in FIG. 11.

Example 3

FIG. 12 illustrates a change in the surface of a metal nano-coating deposited on a glass substrate observed after a phase transition experiment. The coated glass was subjected to laser irradiation at a frequency of 532 nm and a power of one W. The laser beam footprint was about 0.05-0.06 mm in diameter. A rounded region in which melting and re-crystallization occurred is shown in the center of FIG. 12. A metallography study indicated that re-crystallization took place in the rounded and thermally affected zone.

Example 4

Figure 13:
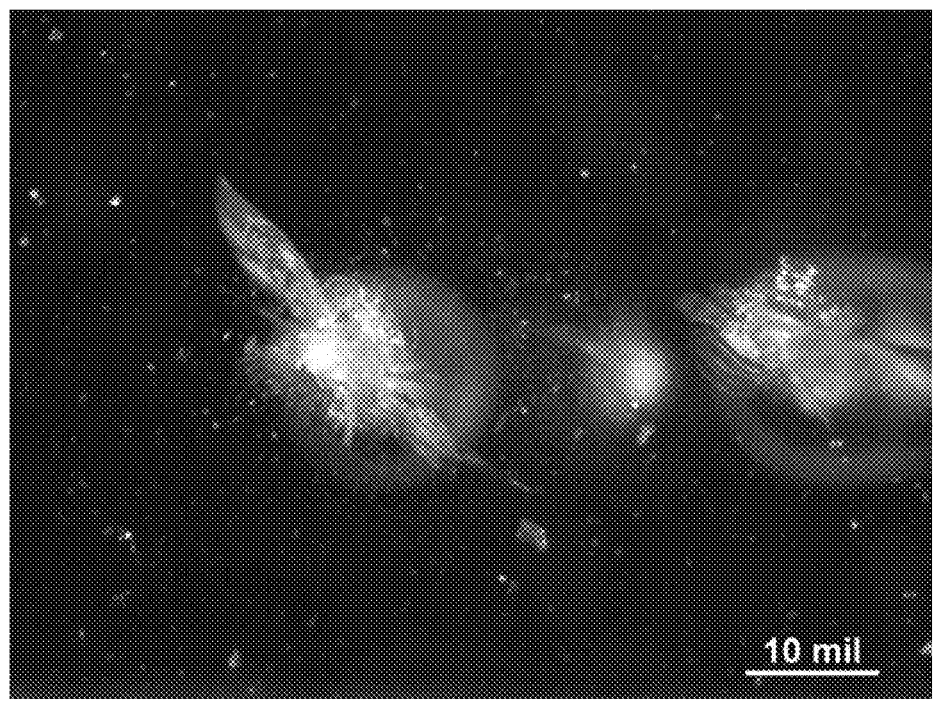
FIG. 13 is a dark field microscopy image of an SLF including a polymer/carbon allotrope coating and insulating glass substrate after subjected to damaging laser radiation.

Thermally induced degradation in a polymer/carbon allotrope coating and thermal fracturing of a glass substrate are shown in FIG. 13. FIG. 13 is a dark field microscopy image of an SLF including a glass slide substrate and a polymer/carbon allotrope coating after exposure to laser radiation by a 1064 nm pulsing laser with a power of about one W. Discoloration of the polymer/carbon allotrope coating and multiple fracturing of the glass slide can be observed in FIG. 13. The amber color polymer/carbon allotrope coating was darkened when subjected to the laser radiation. The increased light absorption and scattering of the darkened polymer/carbon allotrope coating led to the generation of a localized heat flux. The flux not only affected the polymer/carbon allotrope coating, but the glass substrate itself. The localized heat caused thermal fracturing the substrate, as is shown in FIG. 13. This mode of failure is typical for an essentially insulating glass substrate material.

Example 5

Figure 14:
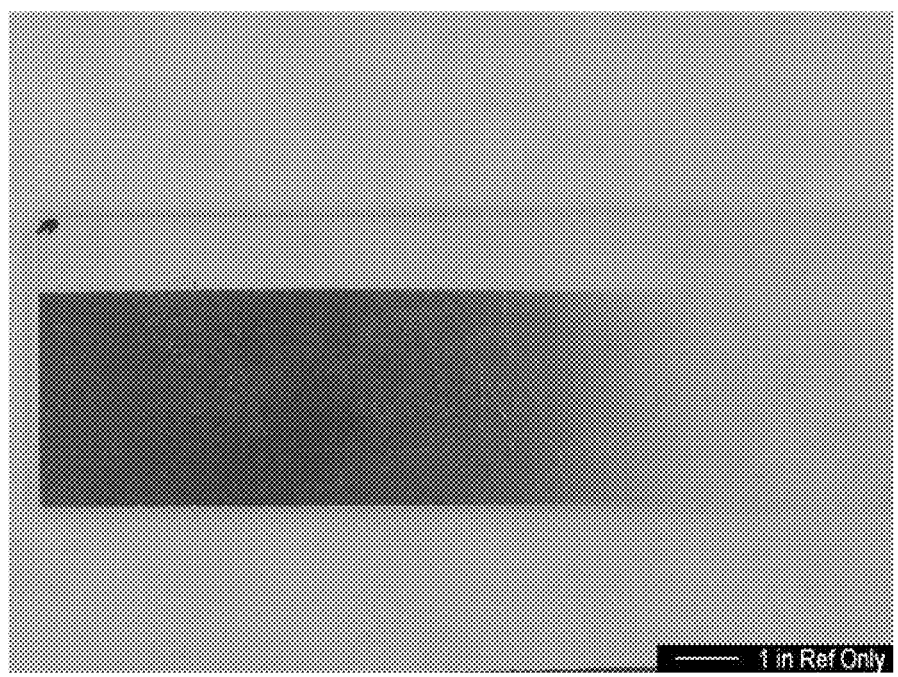
FIG. 14 is an image of a glass substrate uniformly (no-pattern) coated with an In-based eutectic alloy, illustrating that the neutral density of that coating varies from 0 to 99% in a linear manner, and the actual thickness of the metal film varies non-linearly.

FIG. 14 is an image of a calibration slide used to determine a desired thickness of an indium-based film for an SLF. The slide is a standard glass microscope slide coated with an indium-based alloy at linearly varying thickness from one end to the other. The slide coating was evaluated and was determined to demonstrate nearly 0% transmission on the left end and nearly 99.9% transmission in its right end portion (the uncoated zone). The neutral density of the coating varied linearly from right end to left end. The calibration process was carried out by a one W power continuous wave laser with a wavelength of 532 nm that was focused on different points of the calibration slide. The plasmonic resonance and sequentially accompanying dramatically elevated light absorption, heat generation, eutectic melting and re-crystallization first occurred at an alloy thickness of about 32-35 nm having a neutral density of about 65%. This laser damage is illustrated in FIGS. 15 and 16. In FIG. 15 a crater whose approximate outline is indicated in a dotted circle, and thermally induced discoloration of the film, the approximate border of which is indicated by a solid line, can be observed. FIG. 16 is an enlarged image (5× greater magnification) of a portion of the image of FIG. 15. In FIG. 16 the crater, condensation metal drops, the thermally induced discoloration are more clearly visible. The difference between the size of the craters and the thermally affected zone surrounding these craters can also be observed. The ratio of the diameters of the craters v. the surrounding thermally affected zones is about 2-2.5. The neutral density reflecting the calibration at which thermal damage of the film occurred (32-35 nm) may be used for a production run coating using this alloy.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A sacrificial limiter filter comprising:
   a substrate;
   a polymer/carbon allotrope coating adhered to the substrate; and
   a metal nano-coating of a eutectic alloy having a thickness of between about 20 nm and about 50 nm and a melting temperature of less than about 200° C. adhered to the substrate, the metal nano-coating including clusters of nano-aggregates of metal, the eutectic alloy of the metal nano-coating increasing a light absorption coefficient of the sacrificial limiter filter when subjected to one or more unwanted wavelengths of light.

2. The sacrificial limiter filter of claim 1, wherein the polymer/carbon allotrope coating includes one or more of carbon nano-tubes, fullerenes, and graphenes embedded in a polymer matrix.

3. The sacrificial limiter filter of claim 2, wherein the one or more of carbon nano-tubes, fullerenes, and graphenes are included in the polymer/carbon allotrope coating in an amount of between about 0.5% and about 2% by weight.

4. The sacrificial limiter filter of claim 1, wherein a first side of the polymer/carbon allotrope coating is directly adhered to a first side of the substrate and a first side of the metal nano-coating is directly adhered to a second side of the substrate.

5. The sacrificial limiter filter of claim 4, further comprising a second substrate directly adhered to one of a second side of the metal nano-coating and a second side of the polymer/carbon allotrope coating.

6. The sacrificial limiter filter of claim 1, wherein the polymer/carbon allotrope coating and the metal nano-coating are both adhered to a first side of the substrate.

7. The sacrificial limiter filter of claim 6, wherein a first side of the polymer/carbon allotrope coating is directly adhered to the first side of the substrate and a first side of the metal nano-coating is directly adhered to a second side of the polymer/carbon allotrope coating.

8. The sacrificial limiter filter of claim 6, wherein a first side of the metal nano-coating is directly adhered to the first side of the substrate and a first side of the polymer/carbon allotrope coating is directly adhered to a second side of the metal nano-coating.

9. The sacrificial limiter filter of claim 1, wherein the eutectic alloy is one of an indium based alloy and a bismuth based alloy.

10. The sacrificial limiter filter of claim 1, wherein the metal nano-coating includes patterning configured to amplify a magnitude of plasmonic resonance induced by exposure of the metal nano-coating to the unwanted one or more wavelengths of light.

11. The sacrificial limiter filter of claim 1, wherein the substrate comprises one of glass, fused silica, acetate, and polyamide.

12. The sacrificial limiter filter of claim 1, mounted on a translational mechanism proximate an aperture of an optical sensor, the translational mechanism configured to displace a damaged portion of the sacrificial limiter filter out of a path of optical radiation into the aperture and to displace an undamaged portion of the sacrificial limiter filter in to a path of optical radiation into the aperture.

13. The sacrificial limiter filter of claim 1, further comprising a contour metallization lead-frame in electrical contact with the metal nano-coating and configured to deliver electrical energy to the metal nano-coating and preheat the metal nano-coating.

14. The sacrificial limiter filter of claim 1, wherein the metal nano-coating is a neutral density optical filter.

15. A method of fabricating a sacrificial limiter filter, the method comprising:
    selecting a first substrate substantially transparent to optical radiation in a first wavelength range;
    depositing a polymer/carbon allotrope coating on the substrate; and
    depositing clusters of nano-aggregates of a metal to form a metal nano-coating of a eutectic alloy having a thickness of between about 20 nm and about 50 nm and a melting temperature of less than about 200° C. on the substrate, the eutectic alloy of the metal nano-coating increasing a light absorption coefficient of the sacrificial limiter filter when subjected to optical radiation outside the first wavelength range.

16. The method of claim 15, further comprising adhering a second substrate to a surface of one of the polymer/carbon allotrope coating and the metal nano-coating on an opposite side of the one of the polymer/carbon allotrope coating and the metal nano-coating as the first substrate.

17. The method of claim 15, wherein the polymer/carbon allotrope coating and the metal nano-coating are deposited on a same side of the first substrate.

18. The method of claim 15, wherein the polymer/carbon allotrope coating and the metal nano-coating are deposited on opposite sides of the first substrate.

19. The method of claim 15, further comprising forming a contour metallization lead-frame in electrical contact with opposing edges of the metal nano-coating.

* * * * *